US008232758B2

(12) United States Patent
Okita et al.

(10) Patent No.: US 8,232,758 B2
(45) Date of Patent: Jul. 31, 2012

(54) CONTROLLER OF ELECTRIC MOTOR HAVING FUNCTION OF ESTIMATING INERTIA AND FRICTION SIMULTANEOUSLY

(75) Inventors: Tadashi Okita, Minamitsuru-gun (JP); Yukio Toyozawa, Minamitsuru-gun (JP); Naoto Sonoda, Minamitsuru-gun (JP)

(73) Assignee: Fanuc Ltd, Minamitsuru-gun, Yamanashi (JP)

( * ) Notice: Subject to any disclaimer, the term of this patent is extended or adjusted under 35 U.S.C. 154(b) by 166 days.

(21) Appl. No.: 12/822,269

(22) Filed: Jun. 24, 2010

(65) Prior Publication Data

US 2011/0050146 A1  Mar. 3, 2011

(30) Foreign Application Priority Data

Aug. 28, 2009 (JP) ................................. 2009-197652

(51) Int. Cl.
    *G05B 1/06* (2006.01)
(52) U.S. Cl. ........ 318/638; 318/631; 318/434; 318/466; 318/560; 318/470; 369/47.38; 369/124.14; 369/47.4; 369/47.39; 369/124.15; 701/41; 180/446
(58) Field of Classification Search .................. 318/638, 318/568.2, 631, 654, 827, 798–815, 727, 318/675, 456, 434, 280–286, 560, 466–470; 187/393, 290, 610; 212/275; 360/78.06; 369/47.38, 47.4, 47.39, 47.44, 124.14, 124.15; 180/446; 701/41
    See application file for complete search history.

(56) References Cited

U.S. PATENT DOCUMENTS 5,598,077 A * 1/1997 Matsubara et al. ...... 318/568.22
7,187,145 B2 * 3/2007 Tsuruta et al. ................ 318/268
8,005,630 B2 * 8/2011 Andoh et al. ..................... 702/41
2002/0113569 A1 * 8/2002 Iijima et al. .................... 318/727
2007/0216333 A1 * 9/2007 Hagihara ..................... 318/568.2
2010/0148714 A1 * 6/2010 Okita et al. .................... 318/561

FOREIGN PATENT DOCUMENTS

| EP | 1 968 184 A3 | 11/2009 |
|---|---|---|
| JP | 1-218389 A | 8/1989 |
| JP | 1218389 A * | 8/1989 |
| JP | 6-28006 A | 2/1994 |
| JP | 06028006 A * | 2/1994 |
| JP | 8-15058 | 1/1996 |
| JP | 8-140386 | 5/1996 |
| JP | 8-249031 | 9/1996 |
| JP | 2000-172341 | 6/2000 |
| JP | 2000172341 A * | 6/2000 |
| JP | 2004-279139 A | 10/2004 |
| JP | 2004279139 A * | 10/2004 |
| JP | 2006-074896 | 3/2006 |
| JP | 2007-295678 | 11/2007 |
| JP | 2008-228360 A | 9/2008 |
| JP | 2008228360 A * | 9/2008 |

* cited by examiner

*Primary Examiner* — Walter Benson
*Assistant Examiner* — Jorge Carrasquillo
(74) *Attorney, Agent, or Firm* — Drinker Biddle & Reath LLP

(57) ABSTRACT

A controller estimates Coulomb friction itself together with inertia and viscous friction, and reduces the influence of the Coulomb friction on the accuracy of the estimated inertia. In addition, the controller estimates inertia, viscous friction and Coulomb friction simultaneously with sequential adaptation in which a Fourier transformer is not used but an inverse transfer function model is used in order to minimize the estimated error. Data sampled for a predetermined time need not be accumulated, as a result, a large amount of data memory is unnecessary.

10 Claims, 13 Drawing Sheets

FRICTION CHARACTERISTIC

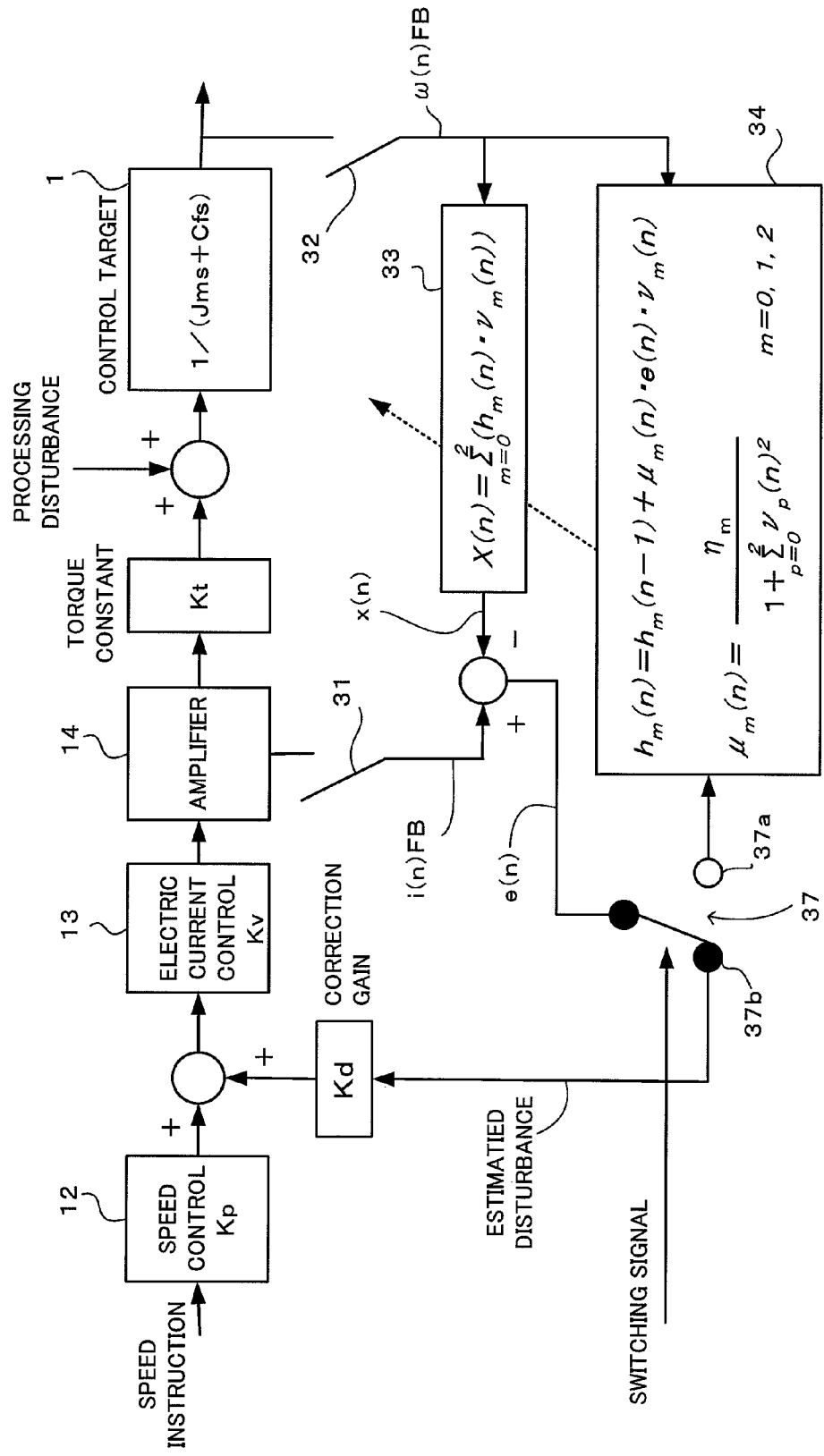

CONTROLLER OF ELECTRIC MOTOR HAVING FUNCTION OF ESTIMATING INERTIA AND FRICTION SIMULTANEOUSLY

RELATED APPLICATION DATA

This application claims priority under 35 U.S.C. §119 and/or §365 to Japanese Application No. 2009-197652 filed Aug. 28, 2009, the entire contents of which are incorporated herein by reference.

BACKGROUND OF THE INVENTION

1. Field of the Invention

The present invention relates to a controller of an electric motor which drives a drive shaft of a machine tool or an industrial machine. More specifically, the present invention relates to a controller of an electric motor having the function of estimating inertia and friction of its drive shaft simultaneously.

2. Description of the Related Art

It is important to identify the magnitudes of the inertia, viscous friction, and Coulomb friction of a driven body of a machine tool driven by an electric motor for determining the processing conditions of the machine tool and for precisely controlling a drive shaft driven by the electric motor.

For instance, in the determination of the time constant of an acceleration and deceleration instruction as the processing conditions, it is necessary to precisely identify inertia and friction for enabling stable control and sufficiently exploiting the ability of acceleration and deceleration of the electric motor. In addition, in control, it is necessary to precisely identify inertia and friction for calculating gain determining the response of speed control. Further, a disturbance observer is configured using inertia and friction so that the robustness of a servo may be improved.

As a technique of estimating inertia, Japanese Patent Application Laid-Open (JP-A) No. 8-140386 discloses a technique of determining inertia by the equation of $J=I \cdot Kt/a$ where the electric current feedback of an electric motor in operation is I, an acceleration determined from speed feedback is a, and the torque constant of the electric motor is Kt.

As a technique of estimating friction, Japanese Patent Application Laid-Open (JP-A) No. 8-15058 discloses a technique of determining viscous friction and Coulomb friction from the torque of an electric motor which is driven at two different speeds so as to be in a stationary state.

As described above, the technique of estimating inertia and friction typically calculates inertia and friction from the electric current feedback I of the electric motor in operation and the acceleration determined from the speed feedback. Aside from this, there is a technique of defining an internal model of a control target to estimate the constants of the model, that is, inertia and friction, so as to reduce an error between a speed output from the model to which a torque instruction is provided and an actual speed.

For instance, Japanese Patent Application Laid-Open (JP-A) No. 8-249031 discloses a technique of calculating inertia and friction using the least-squares method from a relational expression comparing a speed when an acceleration instruction is provided and a model speed. This technique samples an electric current and a speed in acceleration for a predetermined time and calculates inertia and friction by the least-squares method from the accumulated data.

When there is torque offset as in the case of a gravitational axis to which a fixed force is applied or large Coulomb friction, the estimation accuracy of inertia is deteriorated. As the solution, Japanese Patent Application Laid-open (JP-A) No. 2006-074896 discloses a technique of estimating inertia and viscous friction by multiplying a relational expression by the differential of speed feedback for integration or multiplying a differentiated relational expression by the differential of speed feedback for integration.

As a technique of estimating inertia and friction by a machine to which an operation range is limited, Japanese Patent Application Laid-Open (JP-A) No. 2007-295678 discloses a technique of estimating system constants (inertia and friction) from the Fourier coefficient of a torque instruction and the Fourier coefficient of a motor position.

Japanese Patent Application Laid-Open (JP-A) No. 2000-172341 discloses a technique of performing inertia estimation using an M-sequence.

When the configuration of the driven body is complicated, it is not easy to precisely identify inertia and friction of the driven body. In addition, each time inertia and friction of the driven body are changed due to the attachment and detachment of a workpiece, it is necessary to grasp inertia and friction. It is not easy to precisely perform this for a short time.

In the technique disclosed in JP-A No. 8-140386, acceleration and deceleration torque need be stable. It is necessary to operate the electric motor in a relatively wide driving range. The estimation time becomes long.

In the technique disclosed in JP-A No. 8-15058, the procedure of determining torque in a stationary state at a first speed, determining acceleration torque at the time of acceleration, and determining torque in a stationary state at a second speed is necessary. A wide operation range is necessary. The technique is not easily applied to the machine tool to which the operation range is limited.

In the technique disclosed in JP-A No. 8-249031, a wide operation range is required and a large amount of data memory for stacking data is necessary. Although viscous friction can be estimated, Coulomb friction cannot be estimated.

In the technique disclosed in JP-A No. 2006-074896, as in the technique disclosed in JP-A No. 8-249031, a large amount of memory for accumulating data is necessary.

In the technique disclosed in JP-A No. 2007-295678, to determine the Fourier coefficient, Fourier transform is required to be performed. Position and torque data are required to be accumulated to some extent. A large amount of data memory is necessary.

The patent application of Japanese Patent Application No. 2008-320088 that the applicants of this application filed to Japan on Dec. 16, 2008 describes an invention estimating inertia by adding a sine wave instruction at an appropriate frequency to a torque instruction of a controller. In this invention, the motion of an electric motor becomes in a very small range and is not susceptible to the limitation of the driving range. In addition, the estimation time can be shortened by increasing the frequency. However, when friction is large, the estimation accuracy of inertia is lowered.

SUMMARY OF THE INVENTION

Accordingly, in view of the problems of the related art, an object of the present invention is to provide a controller of an electric motor which has the function of estimating inertia and friction simultaneously and improving the estimation accuracy of the inertia.

To achieve the above object, a controller for controlling an electric motor driving a drive shaft of a machine tool or an industrial machine according to the present invention comprises: sine wave instruction means for adding a sine wave instruction to a torque instruction or a speed instruction of the controller; electric current feedback value obtaining means for obtaining an electric current feedback signal of an electric current flowing in the electric motor as an electric current feedback value in every sampling period; speed feedback value obtaining means for obtaining a speed feedback signal of the speed of the electric motor as a speed feedback value in every sampling period; estimated electric current value calculation means for calculating an estimated electric current value from the speed feedback value obtained in every sampling period and estimated inertia and estimated frictional force of the drive shaft; estimated error calculation means for calculating an estimated error from the electric current feedback value obtained in every sampling period and the estimated electric current value; and updating means for updating the estimated inertia and the estimated friction of the drive shaft using the speed feedback value detected in every sampling period and the estimated error.

The estimated electric current value calculation means may comprise speed difference calculation means for calculating the difference between a currently sampled speed feedback value and a previously sampled speed feedback value of the speed feedback detected in every sampling period; first calculation means for calculating the product of the difference of the speed feedback value calculated by the speed difference calculation means and the estimated inertia; second calculation means for calculating the product of the currently sampled speed feedback value and estimated viscous friction; and third calculation means for calculating the product of the polarity of the currently sampled speed feedback and estimated Coulomb friction, wherein the values determined by the first calculation means, the second calculation means, and the third calculation means are used to calculate the estimated electric current value.

The estimated electric current value calculation means may calculate the estimated electric current value using the following equation:

$$x(n) = \frac{Jm}{Kt \cdot T} \cdot (\omega(n) - \omega(n-1)) + \frac{C1}{Kt} \cdot \omega(n) + \frac{C3}{Kt} \cdot \text{sign}(\omega(n))$$

where Jm is the estimated inertia, Kt is the torque constant of the motor, T is the sampling period, C1 is the estimated viscous friction, C3 is the estimated Coulomb friction, sign is a sign, $\omega(n)$ is the speed feedback value sampled in the current period, $\omega(n-1)$ is the speed feedback value sampled in the previous period, x(n) is the estimated electric current value, and n=1, 2, 3 . . . .

The updating means may comprise difference calculation means for calculating the difference between the speed feedback value obtained in the current sampling period and the speed feedback value obtained in the previous sampling period, of the speed feedback values obtained in every sampling period; fourth calculation means for calculating the product of the difference of the speed feedback value calculated by the difference calculation means, the estimated error, and a constant μ1 determining estimation speed; fifth calculation means for calculating the product of the speed feedback value obtained in the current sampling period, the estimated error, and a constant μ2 determining the estimation speed; sixth calculation means for calculating the product of the polarity of the speed feedback value obtained in the current sampling period, the estimated error, and a constant μ3 determining the estimation speed; estimated inertia calculation means for adding the result calculated by the fourth calculation means to the current estimated inertia to calculate a new estimated inertia; estimated viscous friction calculation means for adding the result calculated by the fifth calculation means to the current estimated viscous friction to calculate a new estimated viscous friction; and estimated Coulomb friction calculation means for adding the result calculated by the sixth calculation means to the current estimated Coulomb friction to calculate a new estimated Coulomb friction.

When the equation calculating the estimated electric current is rewritten to the form of:

$$x(n) = h_0 \cdot v_0(n) + h_1 \cdot v_1(n) + h_2 \cdot v_2(n)$$

where h0=Jm/(Kt·T), h1=C1/Kt, h2=C3/Kt, v0(n)=($\omega$(n)−$\omega$(n−1)), v1(n)=$\omega$(n), and v2(n)=sign ($\omega$(n)), the updating means may update the coefficients h0, h1, and h2 in every sampling period by the following two equations:

$$h_m(n) = h_m(n-1) + \mu_m(n) \cdot e(n) \cdot v_m(n)$$

$$\mu_m(n) = \frac{\eta_m}{1 + \sum_{m=0} v_m(n)^2}$$

where e(n) is the estimated error, ηm is the constant determining the estimation speed, m=0, 1, 2, and n=1, 2, 3 . . . .

The electric current feedback value obtaining means may obtain the electric current feedback value in every sampling period via delaying means for delaying the electric current feedback signal by half of the sampling period.

The estimated error calculation means may calculate the estimated error by passing the electric current feedback value through a high-pass filter.

The controller may further comprise, in place of the sign wave instruction means, M-sequence instruction means for generating an M-sequence instruction, and a low-pass filter passing M-sequence instruction from M-sequence instruction means, wherein M-sequence instruction passing through the low-pass filter can be added to the torque instruction or the speed instruction of the controller.

The estimated inertia and the estimated friction may be used to configure a disturbance observer which calculates estimated disturbance torque from the electric current feedback value obtained in every sampling period and the estimated electric current value, the controller can further have means for performing multiplication by correction gain Kd adjusting the amount of correction of the estimated disturbance torque, and means for adding the result to the torque instruction.

According to the present invention, a controller of an electric motor having the function of estimating inertia and friction simultaneously and improving the estimation accuracy of the inertia can be provided.

According to the present invention, the sign wave input or the M-sequence input is used so that the operation region can be smaller, and the method of sequentially updating inertia and estimated friction in every sampling, not the least-squares method, is used. Data sampled for a predetermined time need not be accumulated. A large amount of data memory is unnecessary. Further, Coulomb friction as well as viscous friction can be simultaneously estimated.

According to the present invention, the method of estimating Coulomb friction itself together with inertia and viscous friction is used. The influence of the Coulomb friction on the accuracy of the estimated inertia can be reduced.

According to the present invention, further, there is adopted the method of estimating inertia, viscous friction and Coulomb friction simultaneously with sequential adaptation in which a Fourier transformer is not used but an inverse transfer function model is used in order to minimize the estimated error. Data sampled for a predetermined time need not be accumulated. A large amount of data memory is unnecessary.

BRIEF DESCRIPTION OF THE DRAWINGS

The above and other objects and features of the present invention will be apparent from the description of the following embodiments with reference to the accompanying drawings. In those drawings:

FIG. 13 is a diagram for explaining the reduction of the influence of processing disturbance to enable high-precision processing by stopping the inverse transfer function estimation section and the sine wave input, inputting disturbance torque at the time of processing as an estimated error, and using the estimated error (=estimated disturbance torque) to correct a torque instruction.

DETAILED DESCRIPTION OF THE PREFERRED EMBODIMENTS

Figure 1:
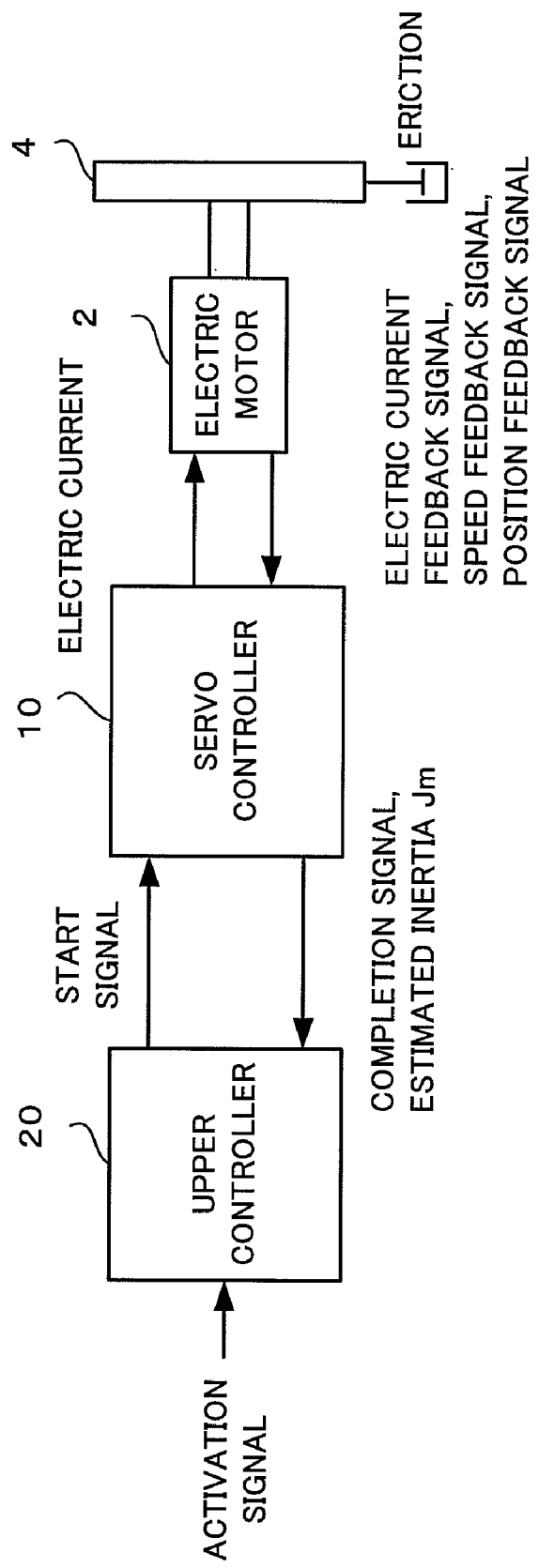
FIG. 1 is a block diagram showing the schematic configuration of a control system including an embodiment of a controller according to the present invention.

FIG. 1 is a block diagram showing the schematic configuration of a control system including an embodiment of a controller according to the present invention.

As shown in FIG. 1, in an embodiment (a servo controller 10) of the controller according to the present invention, an electric motor 2 operating a driven body 4 is a control target. The electric motor 2 is a driving source which changes the position and posture of a table holding a workpiece in a machine tool or is used as a driving source for rotationally operating a robot arm. The driven body 4 includes the table and the robot arm holding a workpiece in a machine tool, the workpiece attached to or detached from the table or the arm, and the operating section of the electric motor 2 itself. The driven body 4 has friction characteristic including viscous friction and Coulomb friction.

The position, speed, and torque of the electric motor 2 are controlled by the servo controller 10. The servo controller 10 is connected to an upper controller 20 such as a CNC (numerical controller) outputting the position, speed, and torque instructions of the electric motor 2 according to the operation process. A plurality of servo controllers 10 may be connected to the upper controller 20.

As described later with reference to FIG. 2, the upper controller 20 has the function of transmitting a start signal to a sine wave instruction generation section 40 and an inertia and friction estimation section 30 of the servo controller 10. The inertia and friction estimation section 30 has the function of transmitting, upon completion of calculation of the estimated values of inertia and friction, a calculation completion signal and data on the inertial obtained by estimation to the upper controller 20. The upper controller 20 has the function of receiving the completion signal transmitted from the inertia and friction estimation section 30 and the inertia Jm obtained by estimation.

Figure 2:
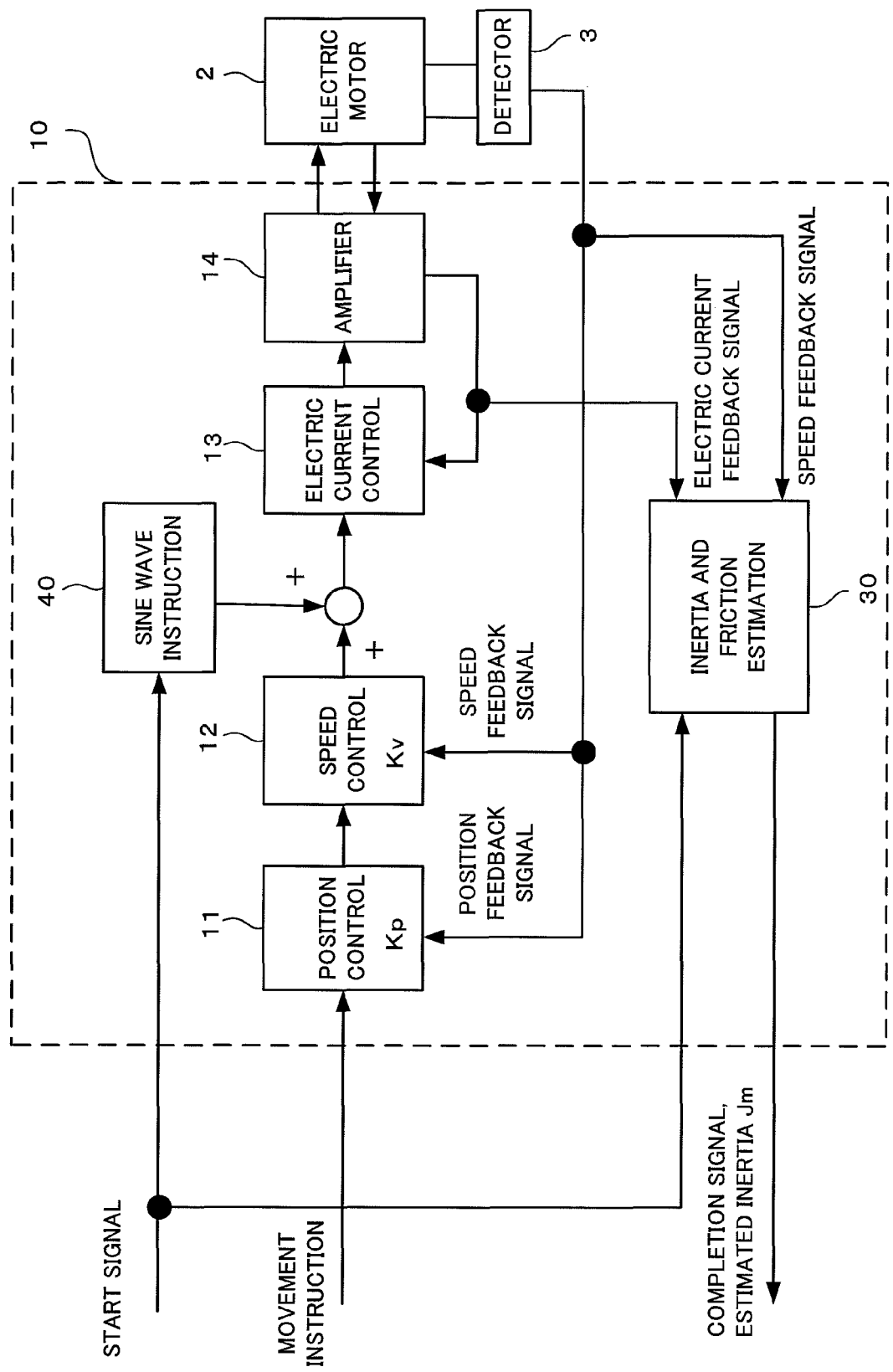
FIG. 2 is a block diagram for explaining the configuration of a servo controller of the control system shown in FIG. 1 in more detail.

FIG. 2 is a block diagram for explaining the configuration of the servo controller 10 shown in FIG. 1 in more detail.

As shown in FIG. 2, the servo controller 10 has a position controlling section 11, a speed controlling section 12, an electric current controlling section 13, and an amplifier 14. The position controlling section 11 and the speed controlling section 12 are operated according to an instruction signal from the upper controller 20 and position and speed feedback signals from a detector 3 attached to the electric motor 2 based on position gain Kp and speed gain Kv set, respectively. The output (voltage instruction) of the electric current controlling section 13 is input to the amplifier 14. The amplifier 14 controls an electric power supplied to the electric motor 2 according to the input signal.

The servo controller 10 further has the inertia and friction estimation section 30. The speed feedback signal from the detector 3 attached to the electric motor 2 and an electric current feedback signal from the amplifier 14 are input to the inertia and friction estimation section 30. The inertia and friction estimation section 30 calculates inertia (moment of inertia) and friction of the driven body 4 simultaneously using the speed feedback signal and the electric current feedback signal. Data of the inertia determined by calculation is output to the upper controller 20 together with the completion signal. Friction can be calculated with Viscous friction and Coulomb friction discriminated.

Figure 3:
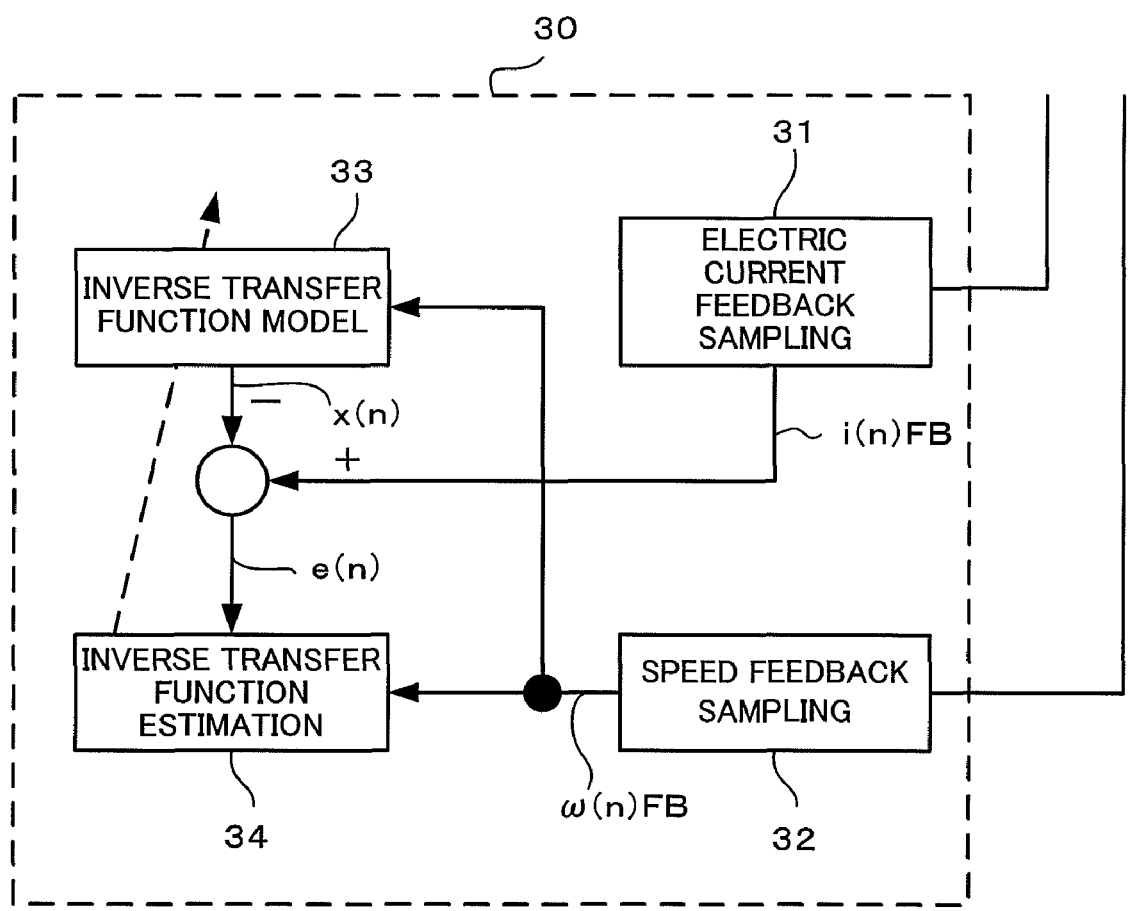
FIG. 3 is a block diagram for explaining the configuration of an inertia and friction estimation section shown in FIG. 2.

FIG. 3 is a block diagram for explaining the configuration of the inertia and friction estimation section 30 shown in FIG. 2.

In FIG. 3, an electric current feedback sampling section 31 samples the electric current feedback signal indicating the electric current value flowing to the electric motor 2 in a predetermined sampling period T and fetches it as an electric current feedback value i(n)FB into the inertia and friction estimation section 30. Likewise, a speed feedback sampling section 32 samples the speed feedback signal output from the detector 3 detecting the speed of the electric motor 2 in the predetermined sampling period T and fetches it as a speed feedback value ω(n)FB into the inertia and friction estimation section 30.

An inverse transfer function model 33 includes a function equation which takes in the estimated inertia Jm corresponding to actual inertia Jms of a control target 1 and estimated friction Cf corresponding to actual friction Cfs of the control target 1. According to the inverse transfer function model 33, the estimated friction Cf is calculated with the estimated viscous friction C1 and estimated Coulomb friction C3 discriminated.

An inverse transfer function estimation section 34 includes a calculation expression which estimates the actual inertia Jms and the actual friction Cfs of the control target 1. The inverse transfer function estimation section 34 estimates the coefficient of the inverse transfer function model 33 by calculation so that an estimated error e(n) can be smaller. The coefficient of the calculation expression of the inverse transfer function model 33 is updated by the coefficient estimated by the inverse transfer function estimation section 34 so that the estimated error e(n) can be smaller. Here, the coefficient includes the estimated inertia Jm, the estimated viscous friction C1, and the estimated Coulomb friction C3.

The description of the function of transmitting and receiving the signals to/from the upper controller 20 of the inertia and friction estimation section 30 shown in FIG. 3 is omitted.

Figure 4:
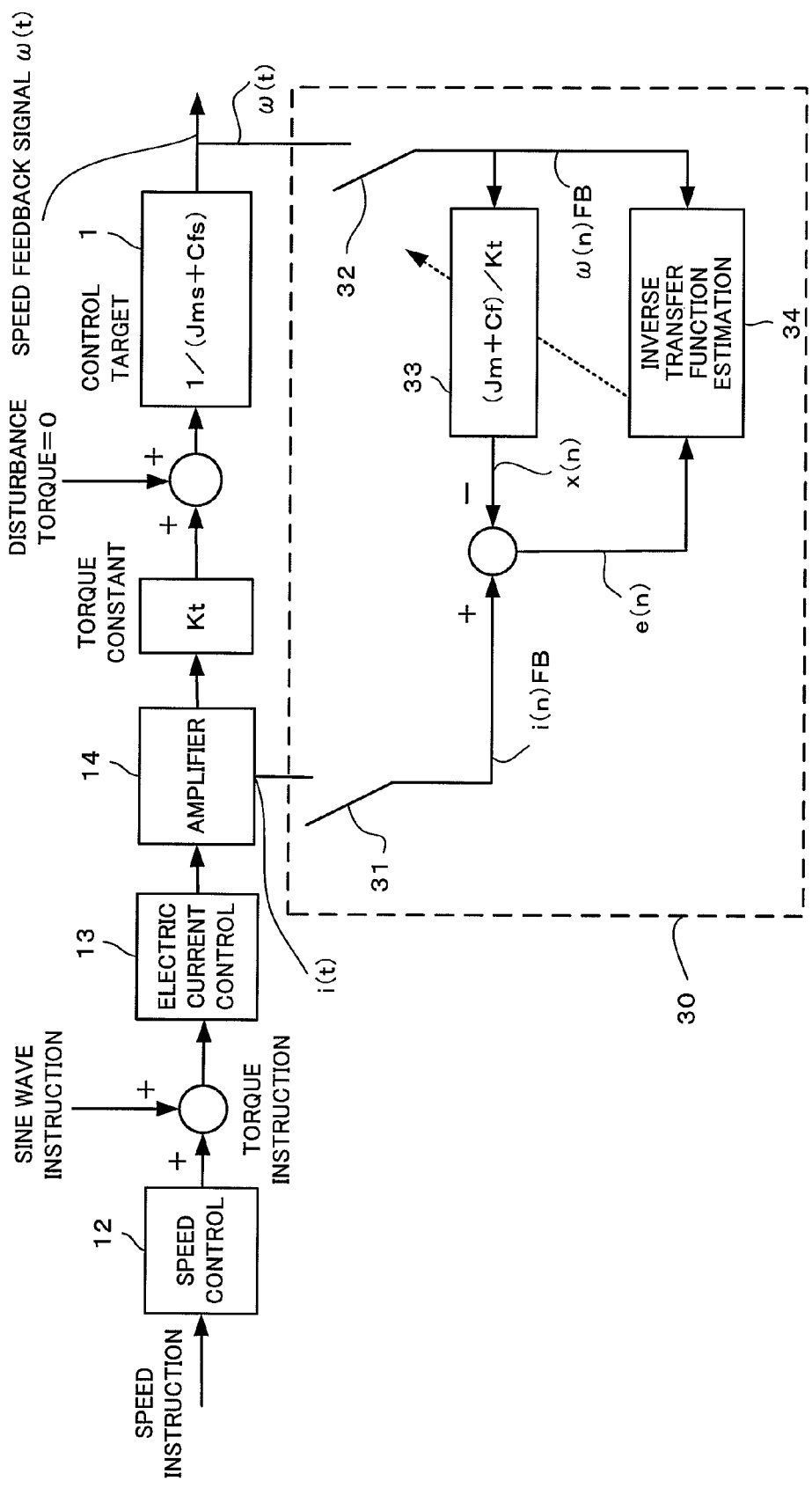
FIG. 4 is a diagram for explaining inverse transfer function estimation executed by the controller according to the present invention.

FIG. 4 is a diagram for explaining inverse transfer function estimation executed by the controller according to the present invention.

In FIG. 4, as described with reference to FIG. 3, the inertia and friction estimation section 30 has the electric current feedback sampling section 31, the speed feedback sampling section 32, the inverse transfer function model 33, and the inverse transfer function estimation section 34. The inertia and friction estimation section 30 starts the inertia and friction estimation process, upon reception of the start signal output from the upper controller 20 (see FIG. 2).

The electric current feedback sampling section 31 samples an electric current feedback signal i(t) indicating the electric current value flowing in the electric motor 2 in the predetermined sampling period T and fetches it as electric current feedback value i(n)FB into the inertia and friction estimation section 30. Likewise, the speed feedback sampling section 32 samples the speed feedback signal ω(t) output from the detector 3 detecting the speed of the electric motor 2 in the predetermined sampling period T and fetches it as speed feedback value ω(n)FB into the inertia and friction estimation section 30.

The speed feedback value ω(n)FB sampled by the speed feedback sampling section 32 is input to the inverse transfer function model 33 and the inverse transfer function estimation section 34. The inverse transfer function model 33 includes a function equation which takes in the estimated inertia Jm and the estimated friction Cf estimated by the inverse transfer function estimation section 34 simultaneously. According to the inverse transfer function model 33, Cf is calculates with the estimated viscous friction C1 and the estimated Coulomb friction C3 discriminated. An estimated electric current value x(n) estimating the electric current value is output from the inverse transfer function model 33. The estimated error e(n) which is the difference between the estimated electric current value x(n) and the electric current feedback value i(n)FB is determined.

The inverse transfer function estimation section 34 includes a calculation expression which estimates the actual inertia Jms and the actual friction Cfs of the control target 1. The inverse transfer function estimation section 34 estimates the coefficient of the inverse transfer function model 33 by calculation in every sampling period so that the estimated error e(n) can be smaller. The coefficient of the calculation expression of the inverse transfer function model 33 is updated by the coefficient estimated by the inverse transfer function estimation section 34 so that the estimated error e(n) can be smaller. The coefficient of the inverse transfer function model 33 includes the estimated inertia Jm and the estimated friction Cf. The estimated friction Cf consists of the estimated viscous friction C1 and the estimated Coulomb friction C3.

Figure 5:
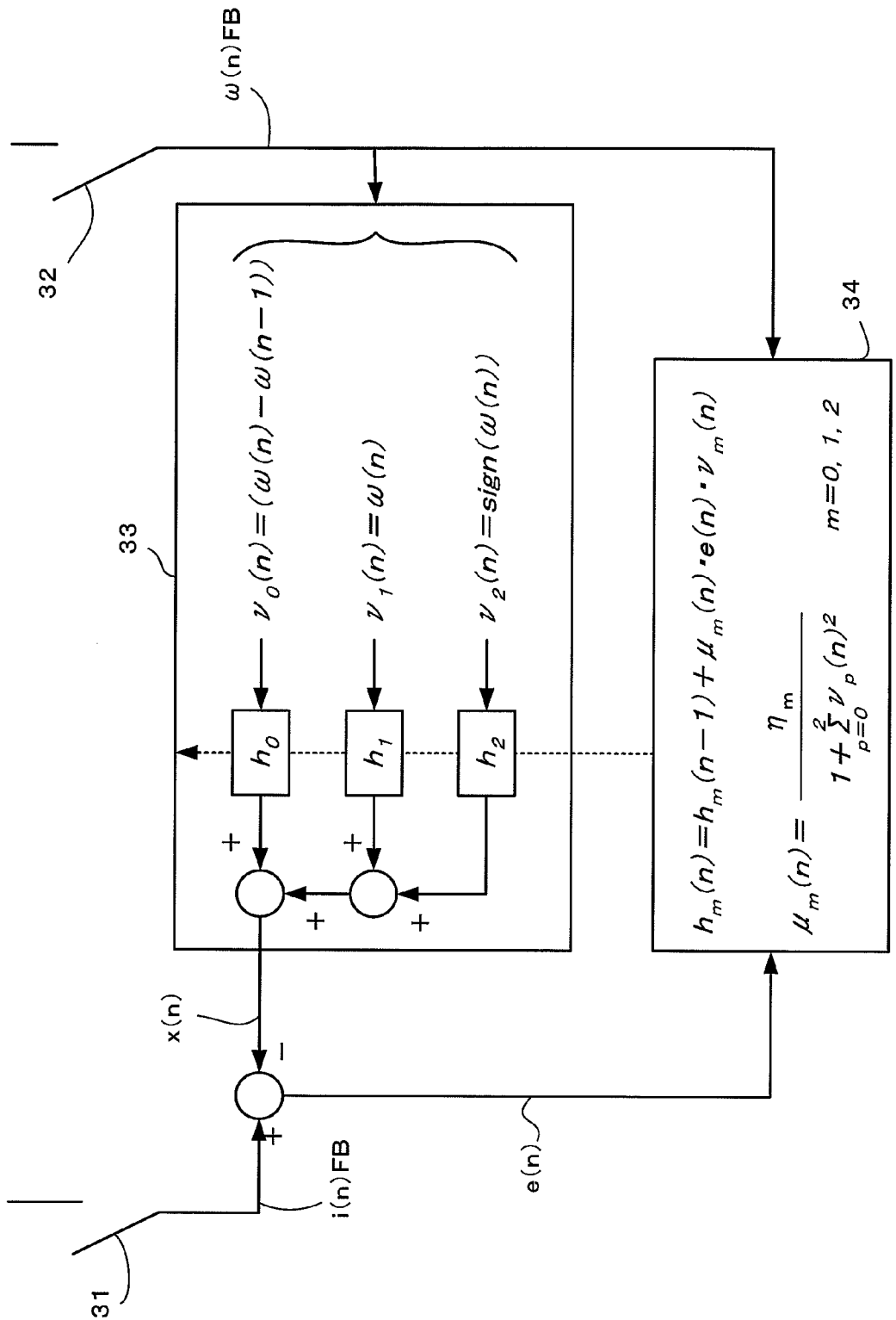
FIG. 5 is a diagram for explaining an inverse transfer function estimation section shown in FIG. 4 estimating a coefficient hm of Equation (2) so that an estimated error e(n) can be smaller.

FIG. 5 is a diagram for explaining the inverse transfer function estimation section 34 shown in FIG. 4, which estimates a coefficient hm of the later-described Equation (2) so that the estimated error e(n) may be smaller.

The inverse transfer function model 33 calculates the estimated electric current value x(n) by the following equation:

$$x(n) = \frac{Jm}{Kt \cdot T} \cdot (\omega(n) - \omega(n-1)) + \frac{C1}{Kt} \cdot \omega(n) + \frac{C3}{Kt} \cdot \text{sign}(\omega(n)) \quad (1)$$

where Jm is the estimated inertia, Kt is the torque constant of the motor, T is the sampling period, C1 is the estimated viscous friction, C3 is the estimated Coulomb friction, sign is a sign, ω(n) is the currently sampled speed feedback value, ω(n−1) is the previously sampled speed feedback value, x(n) is the estimated electric current value, and n=1, 2, 3 . . . . The sign is any one of −1, 0, and +1.

Figure 6:
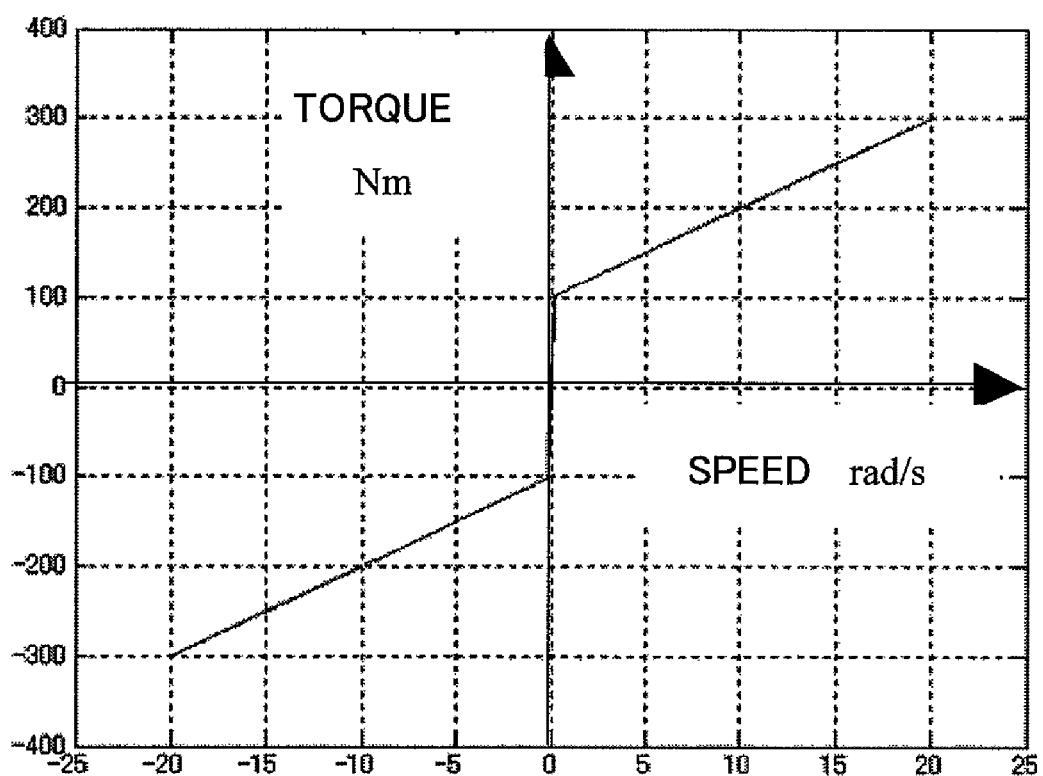
FIG. 6 is a diagram showing the relation between friction characteristic of viscous friction and Coulomb friction and speed.

As shown by Equation (1), the inverse transfer function model 33 according to the present invention is modeled by an inertia term, a viscous friction term, and a Coulomb friction term. The relation between the friction characteristic of viscous friction and Coulomb friction and speed is as shown in FIG. 6.

Here, for simplification of the notation, Equation (1) is rewritten to the following equation:

$$x(n) = h_0 \cdot v_0(n) + h_1 \cdot v_1(n) + h_2 \cdot v_2(n) \quad (2)$$

where h0=Jm/Kt/T, h1=C1/Kt, h2=C3/Kt, v0(n)=ω(n)−ω(n−1), v1(n)=ω(n), v2(n)=sign(ω(n)), and n=1, 2, 3 . . . .

In case of the present invention, even if the initial values (h0, h1, h2) of the estimated inertia Jm and the estimated friction Cf(C1, C3) are estimated from zero or an appropriate value, the estimated inertia Jm and the estimated friction Cf can converge to the actual inertia Jms and the actual friction Cfs. Typically, data estimated and determined previously should be stored and set as the initial value.

The equation updating the coefficients h0(n), h1(n), and h2(n) of Equation (2) is expressed by the following Equations (3) and (4). The coefficients h0(n), h1(n), and h2(n) are updated in every sampling period. The inverse transfer function estimation section 34 estimates the coefficient hm(n) of Equation (2) of the inverse transfer function model 33 so that the estimated error e(n) can be smaller. It should be noted that m=0, 1, 2. m=0 is inertia, m=1 is viscous friction, and m=2 is Coulomb friction.

$$h_m(n) = h_m(n-1) + \mu_m(n) \cdot e(n) \cdot v_m(n) \quad (3)$$

where e(n) is the estimated error, and n=1, 2, 3 . . . .

$$\mu_m(n) = \frac{\eta_m}{1 + \sum_{m=0} v_m(n)^2} \quad (4)$$

where ηm(m=0, 1, 2) is the constant determining the estimation speed, and n=1, 2, 3 . . . .

Figure 7:
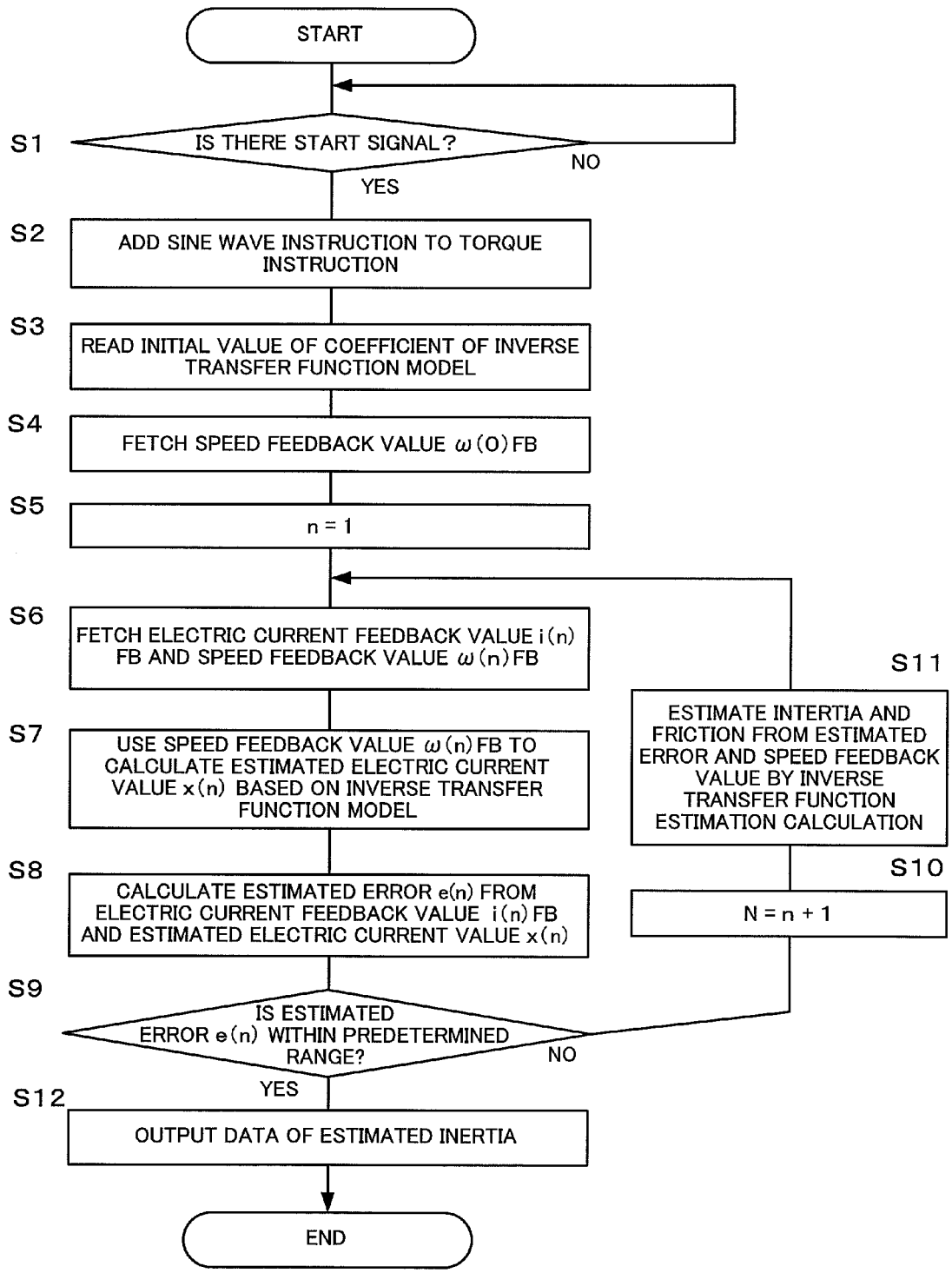
FIG. 7 is a flowchart of the inertia and friction estimation process of a servo controlling section including the inertia and friction estimation section.

FIG. 7 is a flowchart of the inertia and friction estimation process of the servo controlling section 10 including the inertia and friction estimation section 30. This will be described below according to each step.

[Step S1] The operation of start instruction standby of the estimation process of the inertia and friction estimation section 30 from the upper controller 20 is carried out. The start timing of the process of the inertia and friction estimation section 30 can be previously set, as one of the operations of the respective sections according to the processing steps, to the upper controller 20 by an operator. Alternatively, the upper controller 20 may automatically judge the timing at which the actual inertia Jms of the driven body 4 is changed by the attachment and detachment of the workpiece to output the start instruction of the inertia and friction estimation processing section 30.

[Step S2] When the start signal is input, the sign wave instruction generation section 40 outputs a sine wave instruction having a predetermined frequency (e.g., 10 Hz). The output sine wave instruction is added to the torque instruction output from the speed controlling section 12. It is preferred that the speed controlling section 12 be controlled so as to output the fixed torque instruction, which can reduce the variation of estimation accuracy with the operation of the inertia and friction estimation process kept always same.

[Step S3] The initial value of the coefficient of the inverse transfer function model 33 is read.

[Step S4] The feedback (FB) of the speed feedback value ω(0) is fetched.

[Step S5] The index n is set to 1.

[Step S6] The electric current feedback signal and the speed feedback signal are fetched as electric current feedback value i(n)FB and the speed feedback value ω(n)FB from the electric current feedback sampling section 31 and the speed feedback sampling section 32, respectively, in the predetermined sampling period T.

[Step S7] The speed feedback value ω(n) FB is used to calculate the estimated electric current value x(n) based on the inverse transfer function model 33.

[Step S8] The estimated error e(n) is calculated from the electric current feedback value i(n)FB and the estimated electric current value x(n).

[Step S9] It is judged whether or not the estimated error e(n) calculated in Step S8 is within a predetermined range. When the estimated error e(n) is within the predetermined range, the processing proceeds to step S12. When the estimated error e(n) is not within the predetermined range, the processing proceeds to step S10. The fact that the estimated error e(n) is within the predetermined range means that the estimated inertia Jm, the estimated viscous friction C1 and the estimated Coulomb friction C3 converge to the true values.

[Step S10] The value of the index n is incremented by 1.

[Step S11] The estimated error e(n) and the speed feedback value ω(n)FB are used to estimate inertia and friction by the inverse transfer function estimation calculation of the inverse transfer function estimation section 34. The processing proceeds to Step S6 to continue the process.

[Step S12] The estimated inertia Jm is output to the upper controller 20 to end the process.

Upon reception of the estimated inertia Jm from the inertia and friction estimation section 30, the upper controller 20 can calculate the acceleration/deceleration time constant and optimum speed gain. The acceleration/deceleration time constant determined by calculation is used at the time of the instruction calculation of the upper controller 20. Data of the optimum speed gain is transmitted to the servo controller 10.

In an embodiment of the controller according to the present invention, the sign wave instruction output from the sign wave instruction generation section 40 is used, so that the operation region can be smaller, and the method of sequentially updating the estimated inertia Jm and the estimated friction Cf(C1, C3) in every sampling, not the least-squares method, is used. Data sampled for a predetermined time need not be accumulated. Data of the coefficient of at least the inverse transfer function model 33 calculated in the previous sampling period is only stored, as a result, a large amount of data memory is unnecessary. Further, the estimated Coulomb friction C3 as well as the estimated viscous friction C1 can be simultaneously estimated.

As described above, the method of estimating Coulomb friction itself together with inertia and viscous friction is used. The influence of the Coulomb friction on the accuracy of the estimated inertia Jm can be reduced.

There is adopted the method of estimating inertia, viscous friction and Coulomb friction simultaneously with sequential adaptation in which a Fourier transformer is not used but an inverse transfer function model is used in order to minimize the estimated error. Data sampled for a predetermined time need not be accumulated. As a result, a large amount of data memory is unnecessary.

The problem caused by performing differentiation by difference calculation in a discrete system will be described.

Figure 8:
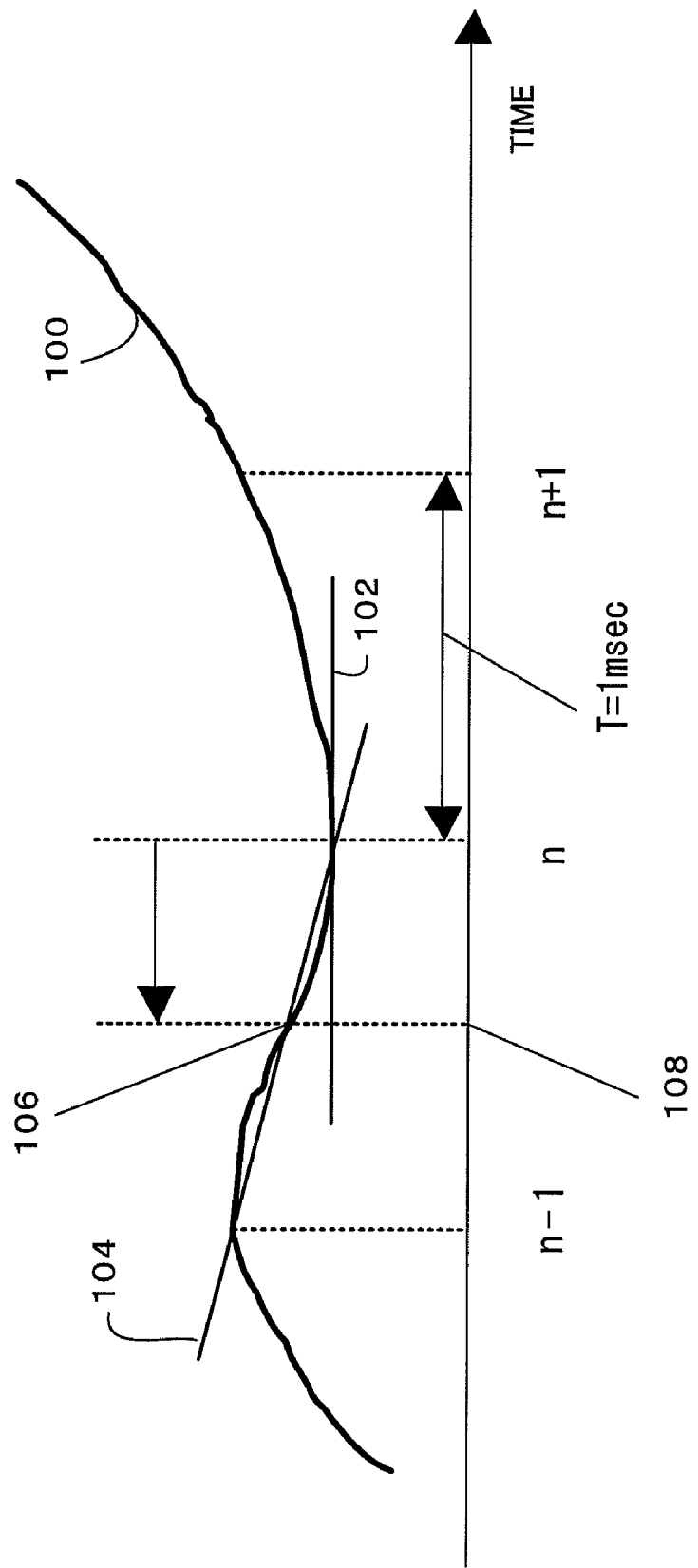
FIG. 8 is a diagram for explaining delay by difference calculation when a speed feedback signal is sampled.

FIG. 8 is a diagram for explaining delay by difference calculation in case where the speed feedback signal is sampled. The differential value at the n-th sample point on a curve 100 indicating the speed feedback signal ω(t) has the inclination of a line segment 102. However, when the differentiation is performed by difference calculation in the discrete system, the differential value is the inclination of a line segment 104 by determining the inclination from the difference between the n−1 and n-th sample points.

In the inverse transfer function model 33, as shown by Equation (1), the inertial term includes the difference calculation of a speed ω(100). Because the inertia term of Equation (1) is dominant, the estimated error e(n) determined as the difference between the electric current feedback value i(n)FB and the estimated electric current value x(n) is corrected so that the difference between the calculation output of the inertia term and the electric current feedback value i(n)FB becomes smaller.

To correct the difference between the inclination of the line segment 102 and the inclination of the line segment 104, the electric current feedback signal is delayed by half of the sampling period. For instance, when the sampling period T is 1 msec, the time delayed is 0.5 msec. As indicated by the reference numeral 106, the inclination of the speed ω(100) at a point 108 at which the electric current feedback signal is delayed by half of the sampling period becomes substantially the line segment 104. In other words, the electric current feedback value i(n) FB when calculating the estimated error e(n) should be sampled from the electric current feedback signal delayed by half of the sampling period T.

Figure 9:
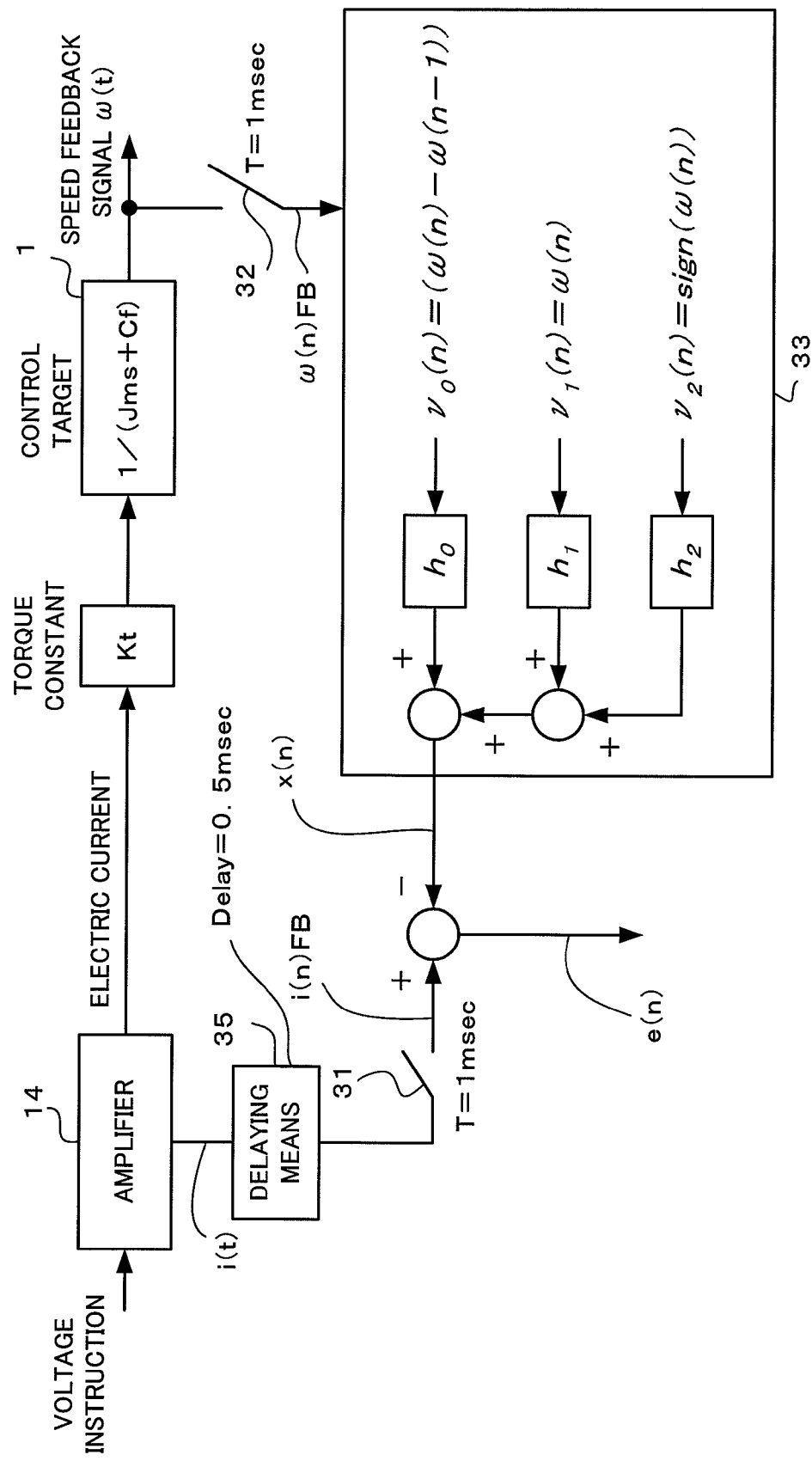
FIG. 9 is a diagram for explaining an embodiment of the controller according to the present invention having means for delaying an electric current feedback signal by half of a sampling period to detect the electric current feedback signal in every sampling period.

FIG. 9 is a diagram for explaining an embodiment of the controller according to the present invention having means for delaying the electric current feedback signal i(t) by half of the sampling period to detect the electric current feedback signal i(t) in every sampling period. The electric current feedback signal i(t) passes through delaying means 35, is delayed by half of the sampling period T, and is input to the electric current feedback sampling section 31.

Figure 10:
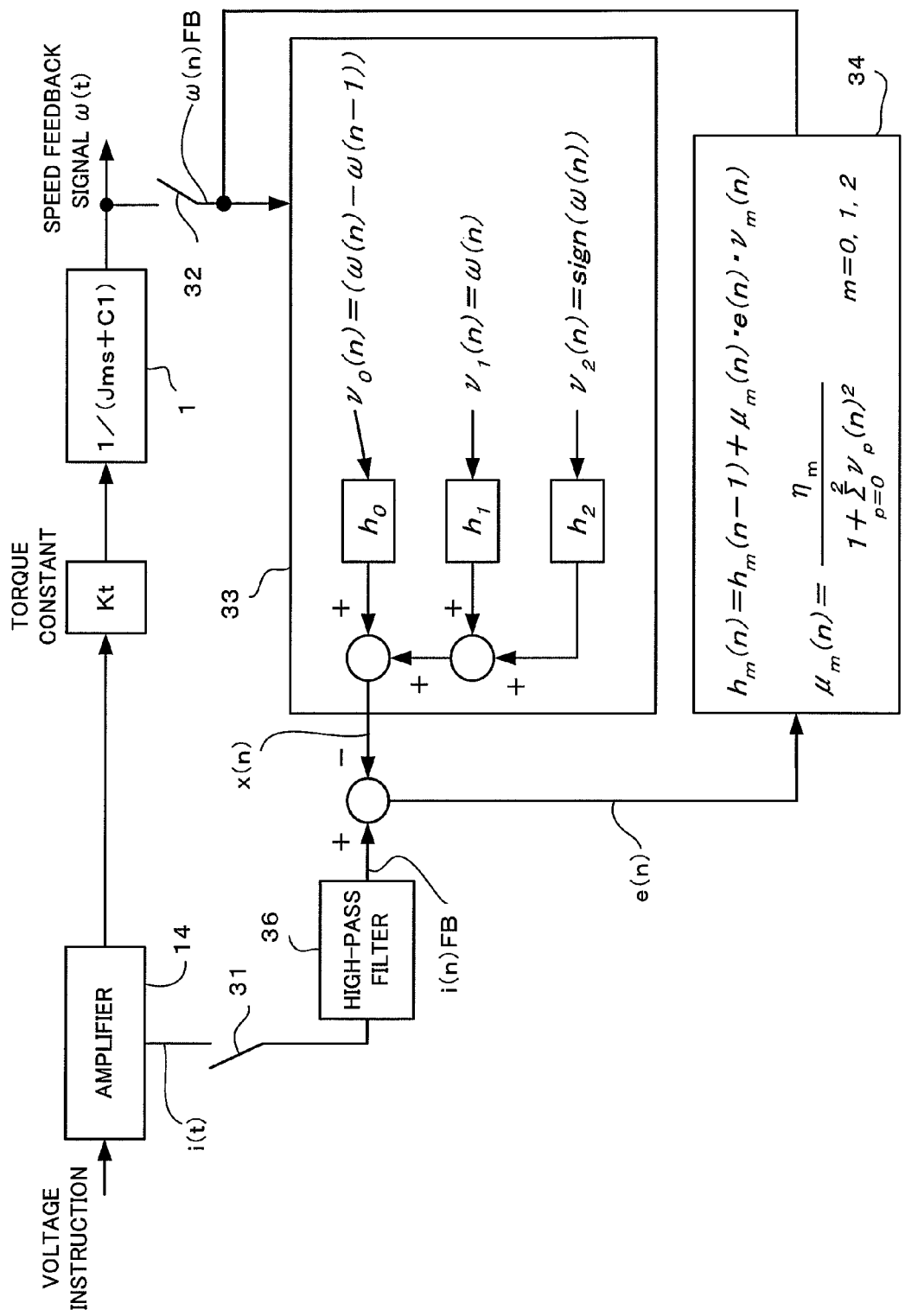
FIG. 10 is a diagram for explaining the improvement of estimation accuracy by passing the electric current feedback value through a high-pass filter to remove the influence of torque offset.

When a fixed force is applied to the driven body 4, torque offset as in the case of a gravitational axis is required to be removed. As shown in FIG. 10, the electric current feedback value i(n) FB passes through a high-pass filter 36, removes the influence of the torque offset, and improves estimation accuracy. The high-pass filter 36 is required to have a sufficiently low frequency bandwidth so as not to affect the frequency of the sine wave instruction input at the time of estimation. By the application of the high-pass filter 36, the influence of torque offset can be removed by simple calculation.

In the present invention, as data sampled for a predetermined time need not be accumulated, a large amount of data memory is unnecessary. As described later, when an M-sequence instruction, in place of the sine wave instruction input at the time of estimation, is input, the high-pass filter 36 is used so that the influence of torque offset is removed.

In an embodiment of the controller according to the present invention, the sine wave instruction is used. In the case of the sine wave input having a single frequency, as an optimum frequency exists for the converging speed and accuracy of the estimated values of inertia and friction, the optimum frequency need to be searched for. In order not to need the search, M-sequence instruction is used.

Figure 11:
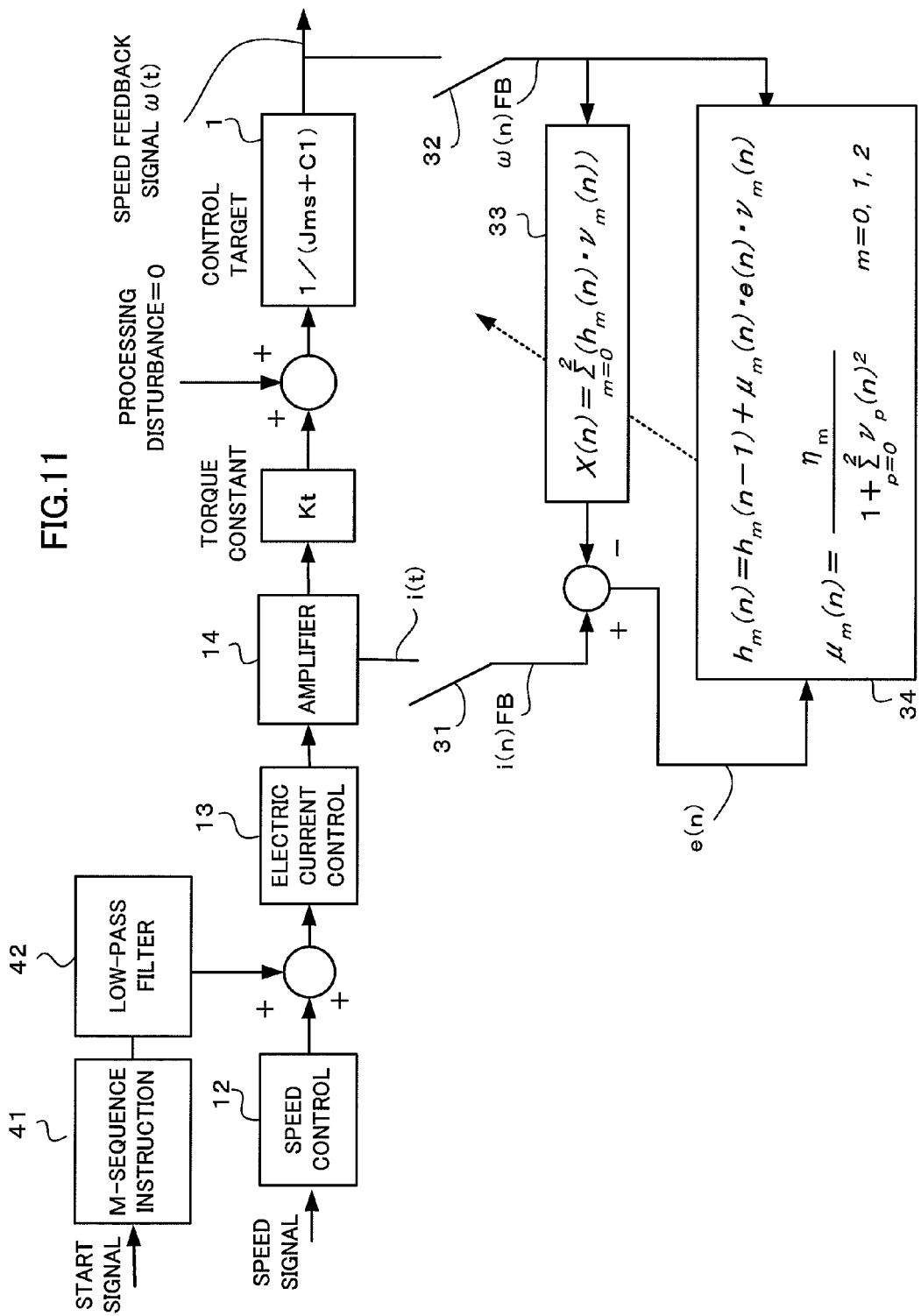
FIG. 11 is a diagram for explaining an embodiment using an M-sequence instruction in place of a sine wave instruction.

FIG. 11 is a diagram for explaining an embodiment using M-sequence instruction in place of the sine wave instruction.

An M-sequence instruction generation section 41 starts the output of M-sequence instruction by the instruction from the upper controller 20. M-sequence instruction output from M-sequence instruction generation section 41 is added to the torque instruction via a low-pass filter 42.

M-sequence instruction includes random signals of 0 and 1. To avoid the abrupt change of the instruction, M-sequence instruction passes through the low-pass filter 42 to remove a high frequency portion so as not to be limited by the torque instruction.

M-sequence instruction is advantageously used at the time of estimation because M-sequence is a signal including a large number of frequency components. In the case of the sine wave input having a single frequency, an optimum frequency exists for the converging speed and accuracy of the estimated values. However, when M-sequence instruction is used, the converging speed and accuracy of the estimated values close to optimum can be obtained without searching for the optimum frequency.

The outline of M-sequence will be described. The input for identification is required to excite a large number of modes of its target, so an input signal has to include a large number of frequency components. White noise as a complete random signal satisfies this condition, but cannot realize it. Instead, a pseudo random signal generated based on a certain rule is used. One of the pseudo random signals which have been used most often is M-sequence having only a binary value.

A clock is put into a shift register having number of stages called the order of M-sequence so that the pseudo random signal may be regularly generated. Its nature has been studied well and known and has randomness within the period determined by the shift register.

The technique disclosed in JP-A No. 2000-172341 mentioned above performs inertia estimation using M-sequence. The estimation algorithm is different from an embodiment of the controller according to the present invention and does not perform friction estimation.

FIGS. 12A to 12D are diagrams of assistance in explaining the improvement of estimation accuracy and estimation speed using M-sequence instruction as the speed input for estimation in an embodiment of the controller according to the present invention.

Figure 12A:
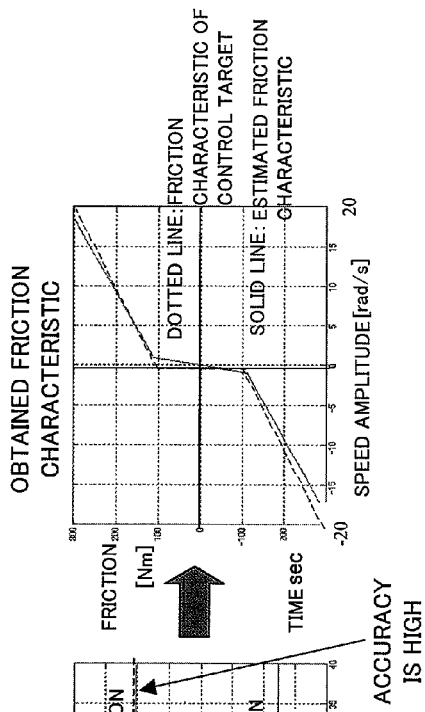
FIGS. 12A to 12D are diagrams of assistance in explaining the improvement of estimation accuracy and estimation speed using M-sequence instruction as a speed input for estimation.
Figure 12B:
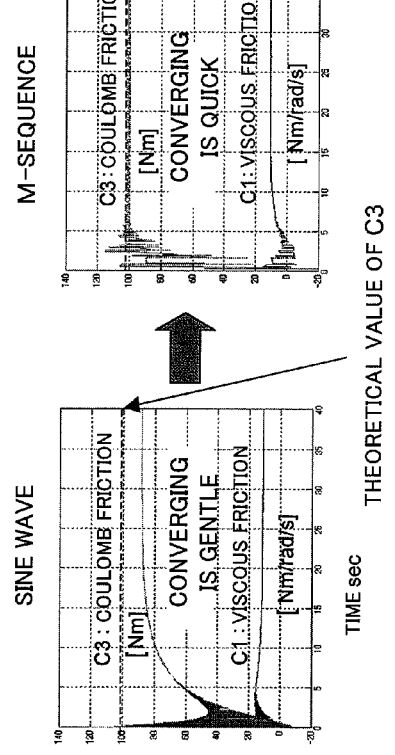
Figure 12C:
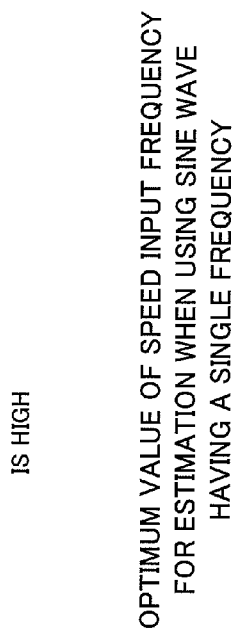
Figure 12D:
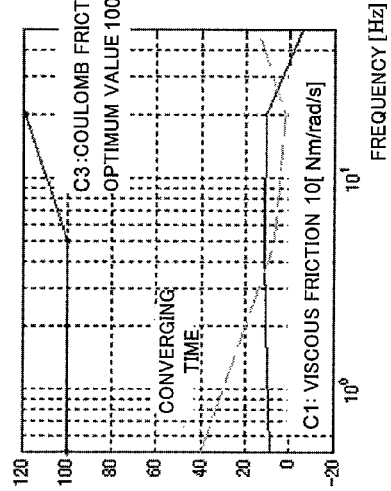

FIG. 12D shows converging time and the accuracy of the estimation coefficient in case where the friction coefficient is estimated using the sine wave signal having a single frequency. With this estimation, it is found that the converging time is long in the frequency region at high accuracy and the accuracy is lowered in the frequency region in which the converging time is short.

FIGS. 12A to 12C are graphs comparing the converging speed and accuracy of the friction coefficient at the time of the sine wave input and the converging speed and accuracy of the friction coefficient at the time of the M-sequence input in order to observe the effect of the M-sequence input. The sine wave is an input having an amplitude of 17 rad/s and a frequency of 5 Hz, whereas M-sequence is an input having the same amplitude as that of the sine wave, a clock of 100 msec, and a 10th order characteristic polynomial=$x^{10}+x^3+1$. FIG. 12A shows the case of the sine wave instruction in which the Coulomb friction C3 converges gently to the theoretical value of the Coulomb friction C3. As shown in FIG. 12B, in the case of M-sequence instruction, the Coulomb friction C3 converges abruptly to the theoretical value. FIG. 12C shows the friction characteristic obtained when M-sequence instruction is input. As shown in FIG. 12C, the friction characteristic and the estimation friction characteristic of the control target are substantially matched.

Using the estimated inertia Jm and the estimated friction Cf determined by an embodiment of the controller according to the present invention, a disturbance observer for estimating processing disturbance torque at the time of processing may be configured. This will be described with reference to FIG. 13. A selector switch 37 is connected to the inverse transfer function estimation section 34 side (a contact 37a) to estimate inertia and friction in the state where there is no disturbance.

As shown in FIG. 13, the inverse transfer function estimation section 34 and the sine wave torque instruction generation section 40 or M-sequence instruction generation section 41 are stopped, the selector switch 37 is switched to the correction gain Kd side (a contact 37b), and the disturbance torque at the time of processing can be estimated as the estimated error e(n). The estimated error e(n), which is an estimated disturbance torque, is used to correct the torque instruction from the speed controlling section 12 so that the influence of the processing disturbance may be reduced to enable high-precision processing. The amount of correction of the torque instruction from the speed controlling section 12 is adjusted by the correction gain Kd.

In the direct driving of the driven body by the electric motor, the present invention has the advantage of improvement of processing accuracy and optimization of the acceleration/deceleration time constant and speed gain by estimating inertia and friction of the control target which changes according to the change of the type of the workpiece attached and detached, using the estimation result for estimating processing disturbance, and reducing this processing disturbance so as to improve processing accuracy.

The speed feedback value to the speed controlling section 12 and the electric current feedback value to the electric current controlling section 13 can be shared among the respective sampling means of the inertia and friction estimation section 30. The delaying means 35 and the high-pass filter 36 can be configured by a digital filter.

What is claimed is:

1. A controller for controlling an electric motor driving a drive shaft of a machine tool or an industrial machine, comprising:
   sine wave instruction means for adding a sine wave instruction to a torque instruction or a speed instruction of the controller;
   electric current feedback value obtaining means for obtaining an electric current feedback signal of an electric current flowing in the electric motor as an electric current feedback value in every sampling period;

speed feedback value obtaining means for obtaining a speed feedback signal of the speed of the electric motor as a speed feedback value in every sampling period;

estimated electric current value calculation means for calculating an estimated electric current value from the speed feedback value obtained in every sampling period and estimated inertia and estimated frictional force of the drive shaft;

estimated error calculation means for calculating an estimated error from the electric current feedback value obtained in every sampling period and the estimated electric current value; and updating means for updating the estimated inertia and the estimated friction of the drive shaft using the speed feedback value detected in every sampling period and the estimated error, wherein inertia and friction are simultaneously estimated, wherein the estimated electric current value calculation means comprising:

speed difference calculation means for calculating the difference between a currently sampled speed feedback value and a previously sampled speed feedback value of the speed feedback detected in every sampling period;

first calculation means for calculating the product of the difference of the speed feedback value calculated by the speed difference calculation means and the estimated inertia;

second calculation means for calculating the product of the currently sampled speed feedback value and estimated viscous friction; and third calculation means for calculating the product of the polarity of the currently sampled speed feedback and estimated Coulomb friction, wherein the values determined by the first calculation means, the second calculation means, and the third calculation means are used to calculate the estimated electric current value.

2. The controller according to claim 1, wherein the estimated electric current value calculation means calculates the estimated electric current value using the following equation:

$$x(n) = \frac{Jm}{Kt \cdot T} \cdot (\omega(n) - \omega(n-1)) + \frac{C1}{Kt} \cdot \omega(n) + \frac{C3}{Kt} \cdot \text{sign}(\omega(n))$$

where Jm is the estimated inertia, Kt is the torque constant of the motor, T is the sampling period, C1 is the estimated viscous friction, C3 is the estimated Coulomb friction, sign is a sign, $\omega(n)$ is the speed feedback value sampled in the current period, $\omega(n-1)$ is the speed feedback value sampled in the previous period, x(n) is the estimated electric current value, and n=1, 2, 3 . . . .

3. The controller according to claim 2, wherein when the equation calculating the estimated electric current is rewritten to the form of:

$$x(n) = h_0 \cdot v_0(n) + h_1 \cdot v_1(n) + h_2 \cdot v_2(n)$$

where h0=Jm/(Kt·T), h1=C1/Kt, h2=C3/Kt, v0(n)=($\omega$(n)−$\omega$(n−1)), v1(n)=$\omega$(n), and v2(n)=sign ($\omega$(n)), the updating means can update the coefficients h0, h1, and h2 in every sampling period by the following two equations:

$$h_m(n) = h_m(n-1) + \mu_m(n) \cdot e(n) \cdot v_m(n)$$

$$\mu_m(n) = \frac{\eta_m}{1 + \sum_{m=0} v_m(n)^2}$$

where e(n) is the estimated error, $\eta$m is the constant determining the estimation speed, m=0, 1, 2, and n=1, 2, 3 . . . .

4. The controller according to claim 1, wherein the electric current feedback value obtaining means obtains the electric current feedback value in every sampling period via delaying means for delaying the electric current feedback signal by half of the sampling period.

5. The controller according to claim 1, wherein the estimated error calculation means calculates the estimated error by passing the electric current feedback value through a high-pass filter.

6. The controller according to claim 1, wherein the estimated inertia and the estimated friction are used to configure a disturbance observer calculating estimated disturbance torque from the electric current feedback value obtained in every sampling period and the estimated electric current value, and wherein the controller further comprises:
means for performing multiplication by correction gain Kd adjusting the amount of correction of the estimated disturbance torque; and
means for adding the result to the torque instruction.

7. A controller for controlling an electric motor driving a drive shaft of a machine tool or an industrial machine, comprising:

sine wave instruction means for adding a sine wave instruction to a torque instruction or a speed instruction of the controller;

electric current feedback value obtaining means for obtaining an electric current feedback signal of an electric current flowing in the electric motor as an electric current feedback value in every sampling period;

speed feedback value obtaining means for obtaining a speed feedback signal of the speed of the electric motor as a speed feedback value in every sampling period;

estimated electric current value calculation means for calculating an estimated electric current value from the speed feedback value obtained in every sampling period and estimated inertia and estimated frictional force of the drive shaft;

estimated error calculation means for calculating an estimated error from the electric current feedback value obtained in every sampling period and the estimated electric current value; and updating means for updating the estimated inertia and the estimated friction of the drive shaft using the speed feedback value detected in every sampling period and the estimated error, wherein inertia and friction are simultaneously estimated, wherein the estimated electric current value calculation means calculates the estimated electric current value using the following equation:

$$x(n) = \frac{Jm}{Kt \cdot T} \cdot (\omega(n) - \omega(n-1)) + \frac{C1}{Kt} \cdot \omega(n) + \frac{C3}{Kt} \cdot \text{sign}(\omega(n))$$

where Jm is the estimated inertia, Kt is the torque constant of the motor, T is the sampling period, C1 is the estimated viscous friction, C3 is the estimated Coulomb friction, sign is a sign, ω(n) is the speed feedback value sampled in the current period, ω(n−1) is the speed feedback value sampled in the previous period, x(n) is the estimated electric current value, and n=1, 2, 3 . . . .

8. The controller according to claim 7, wherein the updating means comprising:
   difference calculation means for calculating the difference between the speed feedback value obtained in the current sampling period and the speed feedback value obtained in the previous sampling period, of the speed feedback values obtained in every sampling period;
   fourth calculation means for calculating the product of the difference of the speed feedback value calculated by the difference calculation means, the estimated error, and a constant μ1 determining an estimation speed;
   fifth calculation means for calculating the product of the speed feedback value obtained in the current sampling period, the estimated error, and a constant μ2 determining the estimation speed;
   sixth calculation means for calculating the product of the polarity of the speed feedback value obtained in the current sampling period, the estimated error, and a constant μ3 determining the estimation speed;
   estimated inertia calculation means for adding the result calculated by the fourth calculation means to the current estimated inertia to calculate a new estimated inertia;
   estimated viscous friction calculation means for adding the result calculated by the fifth calculation means to current estimated viscous friction to calculate new estimated viscous friction; and
   estimated Coulomb friction calculation means for adding the result calculated by the sixth calculation means to the current estimated Coulomb friction to calculate a new estimated Coulomb friction.

9. A controller for controlling an electric motor driving a drive shaft of a machine tool or an industrial machine, comprising:
   sine wave instruction means for adding a sine wave instruction to a torque instruction or a speed instruction of the controller;
   electric current feedback value obtaining means for obtaining an electric current feedback signal of an electric current flowing in the electric motor as an electric current feedback value in every sampling period;
   speed feedback value obtaining means for obtaining a speed feedback signal of the speed of the electric motor as a speed feedback value in every sampling period;
   estimated electric current value calculation means for calculating an estimated electric current value from the speed feedback value obtained in every sampling period and estimated inertia and estimated frictional force of the drive shaft;
   estimated error calculation means for calculating an estimated error from the electric current feedback value obtained in every sampling period and the estimated electric current value; and
   updating means for updating the estimated inertia and the estimated friction of the drive shaft using the speed feedback value detected in every sampling period and the estimated error,
   wherein inertia and friction are simultaneously estimated,
   wherein the updating means comprising:
   difference calculation means for calculating the difference between the speed feedback value obtained in the current sampling period and the speed feedback value obtained in the previous sampling period, of the speed feedback values obtained in every sampling period;
   fourth calculation means for calculating the product of the difference of the speed feedback value calculated by the difference calculation means, the estimated error, and a constant μ1 determining an estimation speed;
   fifth calculation means for calculating the product of the speed feedback value obtained in the current sampling period, the estimated error, and a constant μ2 determining the estimation speed;
   sixth calculation means for calculating the product of the polarity of the speed feedback value obtained in the current sampling period, the estimated error, and a constant μ3 determining the estimation speed;
   estimated inertia calculation means for adding the result calculated by the fourth calculation means to the current estimated inertia to calculate a new estimated inertia;
   estimated viscous friction calculation means for adding the result calculated by the fifth calculation means to current estimated viscous friction to calculate new estimated viscous friction; and
   estimated Coulomb friction calculation means for adding the result calculated by the sixth calculation means to the current estimated Coulomb friction to calculate a new estimated Coulomb friction.

10. A controller for controlling an electric motor driving a drive shaft of a machine tool or an industrial machine, comprising:
    sine wave instruction means for adding a sine wave instruction to a torque instruction or a speed instruction of the controller;
    electric current feedback value obtaining means for obtaining an electric current feedback signal of an electric current flowing in the electric motor as an electric current feedback value in every sampling period;
    speed feedback value obtaining means for obtaining a speed feedback signal of the speed of the electric motor as a speed feedback value in every sampling period;
    estimated electric current value calculation means for calculating an estimated electric current value from the speed feedback value obtained in every sampling period and estimated inertia and estimated frictional force of the drive shaft;
    estimated error calculation means for calculating an estimated error from the electric current feedback value obtained in every sampling period and the estimated electric current value; and
    updating means for updating the estimated inertia and the estimated friction of the drive shaft using the speed feedback value detected in every sampling period and the estimated error,
    wherein inertia and friction are simultaneously estimated,
    further comprising, in place of the sign wave instruction means, M-sequence instruction means for generating an M-sequence instruction, and a low-pass filter passing M-sequence instruction from M-sequence instruction means,
    wherein M-sequence instruction passing through the low-pass filter is added to the torque instruction or the speed instruction of the controller.

* * * * *